(12) United States Patent
Dominissini

(10) Patent No.: US 6,688,641 B2
(45) Date of Patent: Feb. 10, 2004

(54) COMPACT TETHERING SYSTEM AND METHOD FOR AN INFLATABLE CURTAIN

(75) Inventor: David Dominissini, Allen Park, MI (US)

(73) Assignee: Autoliv ASP, Inc., Ogden, UT (US)

(*) Notice: Subject to any disclaimer, the term of this patent is extended or adjusted under 35 U.S.C. 154(b) by 39 days.

(21) Appl. No.: 10/015,473

(22) Filed: Dec. 13, 2001

(65) Prior Publication Data

US 2003/0111828 A1 Jun. 19, 2003

(51) Int. Cl.[7] ................................................ B60R 21/22
(52) U.S. Cl. ............................ 280/730.2; 280/743.2; 280/749
(58) Field of Search .......................... 280/730.2, 743.2, 280/749

(56) References Cited

U.S. PATENT DOCUMENTS

| | | | |
|---|---|---|---|
| 5,224,732 A | 7/1993 | Warner et al. | |
| 5,462,308 A * | 10/1995 | Seki et al. | 280/749 |
| 5,478,114 A | 12/1995 | Maurer et al. | |
| 5,480,181 A | 1/1996 | Bark et al. | |
| 5,788,270 A * | 8/1998 | HÅland et al. | 280/729 |
| 5,865,462 A | 2/1999 | Robins et al. | |
| 5,924,723 A * | 7/1999 | Brantman et al. | 280/730.2 |
| 5,975,566 A * | 11/1999 | Bocker et al. | 280/730.2 |
| 6,149,195 A * | 11/2000 | Faigle | 280/749 |
| 6,158,767 A * | 12/2000 | Sinnhuber | 280/730.2 |
| 6,168,191 B1 * | 1/2001 | Webber et al. | 280/730.2 |
| 6,168,194 B1 * | 1/2001 | Cuevas et al. | 280/730.2 |
| 6,203,058 B1 * | 3/2001 | Elqadah et al. | 280/730.2 |
| 6,224,087 B1 | 5/2001 | Stutz et al. | |
| 6,224,091 B1 * | 5/2001 | Eyrainer et al. | 280/730.2 |
| 6,237,938 B1 * | 5/2001 | Boxey | 280/730.2 |
| 6,237,941 B1 * | 5/2001 | Bailey et al. | 280/730.2 |
| 6,308,982 B1 * | 10/2001 | Wallner et al. | 280/730.2 |
| 6,378,897 B1 * | 4/2002 | Butters et al. | 280/730.2 |
| 6,406,057 B1 * | 6/2002 | Fischer | 280/730.2 |
| 6,508,487 B2 * | 1/2003 | Koster | 280/730.2 |
| 2002/0027341 A1 * | 3/2002 | Bakhsh et al. | 280/730.2 |
| 2002/0175504 A1 | 11/2002 | Tanase et al. | |

FOREIGN PATENT DOCUMENTS

GB   2261636   11/1992

* cited by examiner

Primary Examiner—Paul N. Dickson
Assistant Examiner—George D Spisich
(74) Attorney, Agent, or Firm—James D. Erickson; Sally J. Brown (57) ABSTRACT

The present invention provides a system and method for tethering that may be used to keep a cushion properly positioned for side impact protection, particularly in vehicles in which space rearward of the cushion is limited. A tether attachment assembly according to the invention may include a tether attached to the cushion and to an anchoring point within the vehicle. An intermediate portion of the tether may pass within a tether restraint assembly that includes a tether restraint member attached to a vehicle surface. The tether restraint member may be a flexible strap, rigid bar, or the like. When the cushion deploys, the tether slides along the tether restraint member such that the tension exerted by the tether on the cushion is in the longitudinal direction.

36 Claims, 5 Drawing Sheets

COMPACT TETHERING SYSTEM AND METHOD FOR AN INFLATABLE CURTAIN

BACKGROUND OF THE INVENTION

1. Field of the Invention

The present invention relates to systems and methods for protecting vehicle occupants from injury. More specifically, the present invention relates to a compact tethering system for maintaining the position of a cushion of an airbag system, such as an inflatable curtain designed to protect vehicle occupants against lateral impact.

2. Description of Related Art

The inclusion of inflatable safety restraint devices, or airbags, is now a legal requirement for many new vehicles. Airbags are typically installed in the steering wheel and in the dashboard on the passenger side of a car. In the event of an accident, an accelerometer within the vehicle measures the abnormal deceleration and triggers the explosion of pressurized gas from an inflator. Expanding gases from the inflator fill the airbags, which immediately inflate to protect the driver and/or a passenger from impact against the windshield, dashboard, and steering wheel.

Side impact airbags have also been developed in response to the need for protection from impact against the side of the vehicle (also known as lateral impact). These airbags, which are commonly referred to as "inflatable cushions" or "inflatable curtains," may be mounted in the vehicle over the doors, and may inflate during an accident to cover the windows, doors, and lateral surfaces of the vehicle. The inflatable cushion may also be connected to tethers that extend from the ends of the airbag to anchoring points within the vehicle. These tethers may exert tension on the inflated cushions to keep the cushions generally between the occupant and the lateral surface of the vehicle.

However, tether systems known in the art have a number of disadvantages. First of all, many known tether systems require that the tether be extended longitudinally away from both ends of the inflatable cushion. Consequently, the front tether must be extended from the front end of the inflatable cushion toward the front of the vehicle and the rear tether must be extended from the rear end of the inflatable cushion toward the rear of the vehicle. Such a design is incompatible with most trucks and sport utility vehicles ("SUVs") in which the passenger compartment of the vehicle ends abruptly behind a lateral surface over which it would be desirable to position a cushion. In these vehicles, there is typically insufficient space for tether extension rearward from the edge of the inflatable cushion. Accordingly, most known tethering systems cannot be used.

One of the main purposes in attaching a tethering system to an inflatable cushion is to protect the occupant by applying tension to the inflatable cushion to keep the inflatable cushion in the proper position. Without such tension, there is an inherent risk that the inflatable cushion will improperly inflate and injure the occupant. Additionally, during rollover conditions, if the inflatable cushion is not secured in the proper position via tethers, the motion of the occupant may force the inflatable cushion out of an open window, thereby eliminating any possible safety benefits of the inflatable cushion.

Furthermore, side impact inflatable cushions are often classified according to the compaction process used to compact the inflatable cushion. In general, there are two different categories of cushions: those that are compacted by rolling and those that are compacted by accordion folding. However, many previously known tethering systems are designed for use with a specific compaction process; as a result, they cannot be used with both rolled and accordion-folded cushions. Rather, a specific tethering system must often be designed for each type of inflatable cushion. As a result, the cost-effectiveness and interchangeability of known inflatable cushions have suffered somewhat.

Additionally, many known inflatable cushions and tethering systems provide insufficient tension to prevent occupant excursion. "Occupant excursion" occurs when all or part of the vehicle occupant is extended or ejected from the vehicle, usually through an open door or window, during an accident. Obviously, occupant excursion can be very dangerous, especially during rollover conditions. However, since many known tethering systems permit the airbag cushion to move far enough to expose the window and door of the vehicle, these systems may not provide sufficient protection against occupant excursion.

Similarly, "bag slap" may occur when the cushion inflates inward of the window or door to strike an occupant. Many known tethering systems provide inadequate protection against bag slap.

Accordingly, a need exists for a tethering system suitable for use in vehicles that do not have sufficient interior space behind the inflatable cushion to extend a rear tether. Furthermore, a need exists for such a tethering system that tensions the cushion tightly enough to keep the cushion in place during inflation and impact of an occupant against the cushion. Such a tethering system should be cost effective to manufacture and install, and should preferably be usable with cushions folded by any common method.

SUMMARY OF THE INVENTION

The apparatus of the present invention has been developed in response to the present state of the art, and in particular, in response to the problems and needs in the art that have not yet been fully solved by currently tethering systems. Thus, it is an overall objective of the present invention to provide tethering systems and related methods that provide adequate tension to prevent occupant excursion without requiring a great deal of space in the vehicle, and without requiring the use of a specific cushion folding process.

To achieve the foregoing objective, and in accordance with the invention as embodied and broadly described herein in the preferred embodiment, an enhanced tethering system and method are provided. According to one configuration, an inflatable curtain module may incorporate a cushion attached to a front tether anchoring point within the vehicle by a front tether, and to a rear tether anchoring point by a tether attachment assembly.

In the case of a vehicle with an abrupt rear surface, such as a truck or SUV, the rear tether anchoring point may be generally perpendicular to, or at least laterally offset from, the cushion in the deployed configuration. For example, the rear tether anchoring point may be on or near an abrupt rear surface, near the junction of the vehicle roof with the abrupt rear surface. The tether attachment assembly may be used to provide longitudinal tension on the inflated cushion despite the limited longitudinal space within the passenger compartment of the vehicle.

More specifically, the tether attachment assembly may have a rear tether connected to the cushion and to the vehicle at the rear tether anchoring point. An intermediate portion of the rear tether may pass within a tether restraint assembly designed to divert the rear tether such that the tether pulls the cushion rearward instead of pulling the cushion inward, toward the rear tether anchoring point. The tether restraint assembly may have a tether restraint member attached to a vehicle surface at first and second restraint anchoring points such that the intermediate portion is captured between the tether restraint member and the vehicle surface. The tether restraint member may, for example, take the form of a flexible strap similar in structure to the tether.

When the cushion is in the stowed configuration, the rear tether may extend directly rearward of the cushion to pass within the tether restraint assembly, and may then extend generally perpendicular to the cushion to reach the rear tether anchoring point. Upon deployment of the cushion, the rear tether may be pulled downward so that the intermediate portion slides along the tether restraint assembly.

If the cushion has been accordion folded, the rear tether may be substantially untwisted during deployment. If the cushion has been rolled, the rear tether may twist to accommodate unrolling of the cushion. The tether restraint assembly accommodates such twisting. Regardless of whether twisting of the rear tether has occurred, the front and rear tethers may then cooperate to tension the cushion along the bottom edge of the cushion, thereby protecting the occupant against bag slap caused by inward inflation of the cushion, or against excursion from the vehicle.

According to one alternative embodiment, the tether restraint member may instead be a rigid member. For example, the tether restraint member may take the form of a bar attached to the vehicle surface in a manner similar to the strap. The rear tether may then respond to deployment of the cushion in a manner similar to that described above to keep the cushion in place.

Through the use of the tethering systems of the present invention, an occupant of a vehicle can be protected from both inward inflation and excursion from the vehicle. Due to the compact design of the present invention, such protection is made available even in vehicles with limited longitudinal space for tether attachment. Furthermore, a variety of curtain compaction techniques can be used without substantially changing the configuration of the tether attachment assembly.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 5, is not intended to limit the scope of the invention, as claimed, but is merely representative of presently preferred embodiments of the invention.

The present invention provides a tethering system and method whereby problems associated with previously known tethering schemes can be resolved, particularly with application to vehicles with limited longitudinal tethering space. More specifically, through the use of tension redirection, rearward tension may be applied to the cushion without requiring that the rear tether be attached far rearward of the cushion. Furthermore, application of the tension at the level of the bottom edge of the cushion serves a dual purpose by keeping the cushion from moving inward as well as outward. Thus, vehicle occupants are effectively protected from excursion from the vehicle as well as from concussion due to improper inflation of the cushion.

Yet further, a tethering design that permits twisting of the tether enables the use of the tether attachment assembly with multiple cushion compaction schemes. Rolled or accordion folded cushions may be used with little adaptation of the tether attachment assembly. Hence, the tether attachment assembly can be used with a wide range of vehicles and airbag systems. The manner in which the above described principles are implemented by the present invention will be described in greater detail with reference to FIGS. 1 through 5, as follows.

Figure 1:
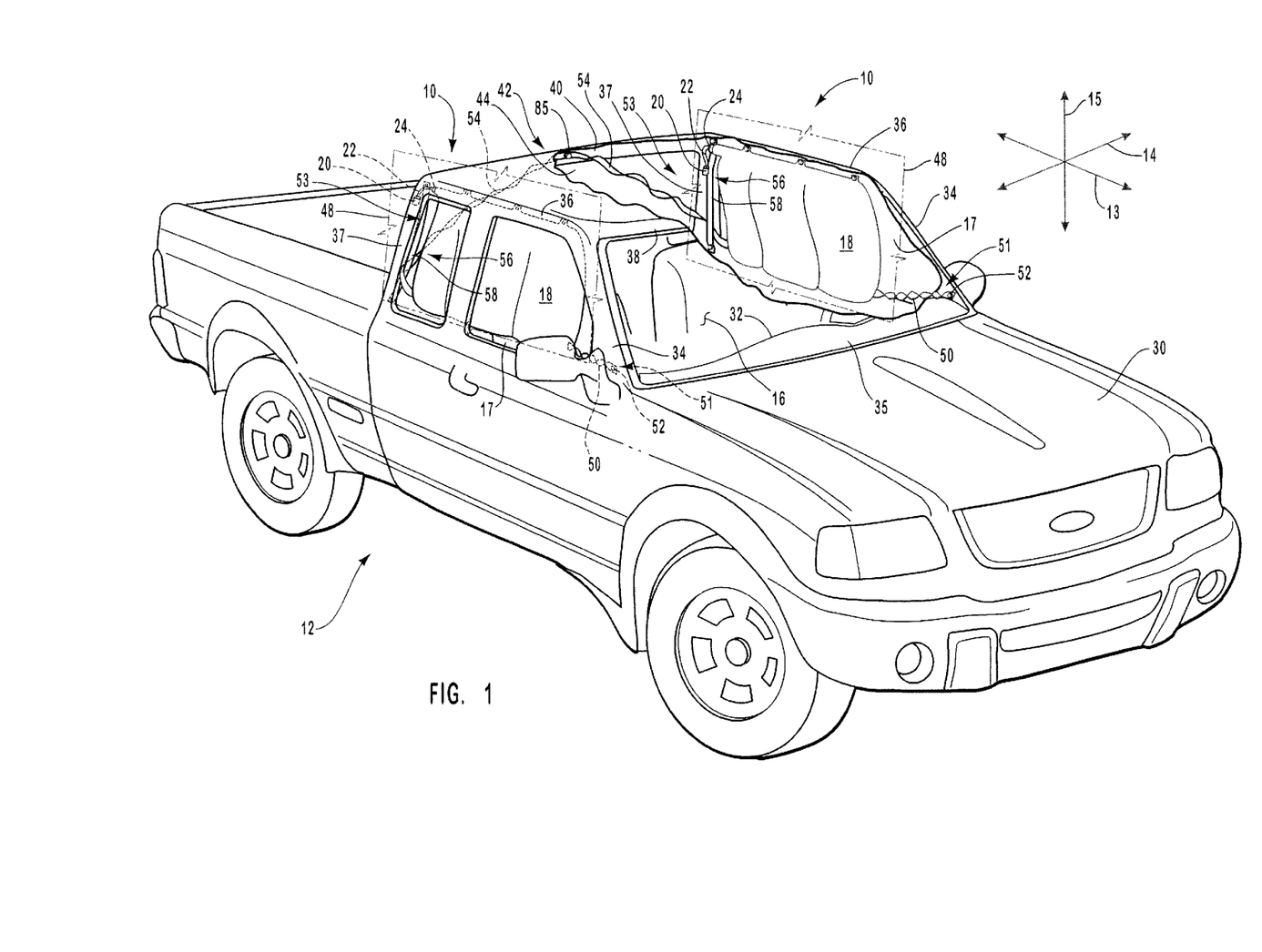
FIG. 1 is a perspective view of a vehicle with an inflatable curtain module including one embodiment of a tethering system according to the invention.

Referring to FIG. 1, an inflatable curtain module 10, (hereinafter "IC module"), according to one possible embodiment of the invention is shown installed in a vehicle 12. The IC module 10 may form part of an airbag system configured to protect one or more vehicle occupants against lateral impact through the formation of a protective curtain beside the occupants. As shown, the vehicle 12 is a compact truck; however, the IC module 10 may be incorporated in many different vehicle types.

The vehicle 12 has a longitudinal direction 13, a lateral direction 14, and a transverse direction 15. The vehicle 12 further has seats 16 laterally displaced from lateral surfaces 17, or doors 17, as shown in the vehicle 12 of FIG. 1. As shown, two IC modules 10 may be used: one for the driver's side of the vehicle 12, and the other for the passenger's side. Each of the IC modules 10 may have a cushion 18 and tethering systems to keep the cushion 18 in place, as will be described in greater detail subsequently.

One or more accelerometers 20 or other similar impact sensing devices detect sudden lateral acceleration (or deceleration) of the vehicle 12 and transmit electric signals via electric lines 22 to one or more inflators 24 that provide pressurized gas to inflate the cushions 18. As shown in FIG. 1, two separate inflators 24 may be used: one for each of the IC modules 10. The inflators 24 may be positioned rearward of the cushions 18, as shown, or may be disposed forward of the cushions 18 or at any other position that permits rapid gas flow from the inflators 24 to the cushions 18.

Each of the inflators 24 may take the form of a hollow pressure vessel containing a chemically reactive material and/or compressed gas that can be activated or released upon application of electricity to provide an outflow of inflation gases. In the exemplary configuration of FIG. 1, the inflators 24 are partially enveloped within the curtains 18 so that inflation gases exiting the inflators 24 flow directly into the curtains 18. The inflators 24 may operate with such rapidity that, before the vehicle 12 has fully reacted to the impact, the cushions 18 have inflated to protect vehicle occupants from impact.

Optionally, the accelerometer 20 may be stowed within an engine compartment 30 or dashboard 32 of the vehicle 12. A controller (not shown) may also be used to process the output from the accelerometer 20 and control various other aspects of a vehicle safety system of the vehicle 12; such a controller may also, for example, be positioned in the engine compartment 30 or dashboard 32, proximate the accelerometer 20. In such a configuration, the electric line 22 and/or other control wiring may be disposed along the A pillars 34 of the vehicle 12, on either side of the windshield 35, to reach the inflators 24. Alternatively, each accelerometer 20 may be positioned near one of the inflators 24, as shown in FIG. 1.

The inflators 24 and the curtains 18 may be attached to roof rails 36 of the vehicle 12. Depending on the model of the vehicle 12 and the desired configuration of the IC modules 10, airbag components may also be disposed within the doors 17 or along B pillars 37, a roof 38, or a rear strut 40 extending between the B pillars 37.

The vehicle 12 shown in FIG. 1 is a compact truck; hence, the B pillars 37 are joined by an abrupt rear surface 42 with a rear window 44. The term "abrupt" refers to the near-vertical orientation of the abrupt rear surface 42. With many known inflatable curtain systems, rear tethers would extend a significant distance rearward of the cushion to provide rearward tension. However, the presence of the abrupt rear surface 42 makes traditional rear tethering schemes unusable because there is insufficient space rearward of the cushions 18. Consequently, side impact protection in trucks, SUVs, and certain minivans presents a unique problem, to which the present invention is addressed.

The cushions 18 may be tethered in such a manner that each of the cushions 18 is kept within a protection plane 48 extending between the occupants of the vehicle 12 and the doors 17. The protection planes 48 do not represent any physical part of the vehicle 12, but simply represent the optimal protective positions for the cushions 18. Motion of the cushions 18 inward of the protection planes 48 during inflation presents a risk of occupant injury due to bag slap, or collision of the cushions 18 with the occupants. Similarly, motion of the cushions 18 outward of the protection planes 48 enables injury due to occupant ejection or the extension of a body part out of open doors 17 or windows.

In order to keep the cushions 18 within the protection planes 48, each of the IC modules 10 may have a front tether 50 attached to the vehicle 12 at a front tether anchoring point 51. The front tether 50 may be attached through the use of a front tether anchor 52, such as a rivet, bolt, rotatable anchor plate, sewn attachment, or adhesive layer. The front tether anchoring point 51 may be located on the A pillar 34, as depicted in FIG. 1, or may be attached to other parts of the vehicle 12, as known in the art.

Each IC module 10 may also have a tether attachment assembly 53 positioned rearward of the cushions 18 to exert tension opposed to that of the front tether 50. The tether attachment assemblies 53 may each include a rear tether 54 attached proximate the abrupt rear surface 42. Each of the tether attachment assemblies 53 may have a tether restraint assembly 56 that redirects the tension of the rear tethers 54 in such a manner that the rear tethers 54 pull the cushions 18 rearward rather than in the lateral direction 14, along the abrupt rear surface 42. The front and rear tethers 50, 54 may be constructed of a flexible, yet stretch resistant material such as seatbelt webbing or the like.

The tether restraint assemblies 56 may be configured in a number of ways; in the embodiment of FIG. 1, each tether restraint assembly 56 has a tether restraint member 58 attached to the vehicle 12. The tether restraint assembly 56 may also be constructed of seatbelt webbing or some other sturdy, yet flexible material. The configuration and operation of the tether restraint members 58 will be described in greater detail subsequently.

Although each IC modules 10 of FIG. 1 include only a single cushion 18, the invention encompasses the use of inflatable curtain modules with any number of cushions. In vehicles with longer passenger compartments, such as SUVs, vans, and minivans, multiple cushions may installed and, together or separately, coupled to front tethers and tether attachment assemblies like those of FIG. 1. Longer, unitary cushions may also be used with the tether attachment assemblies of the present invention.

Figure 2:
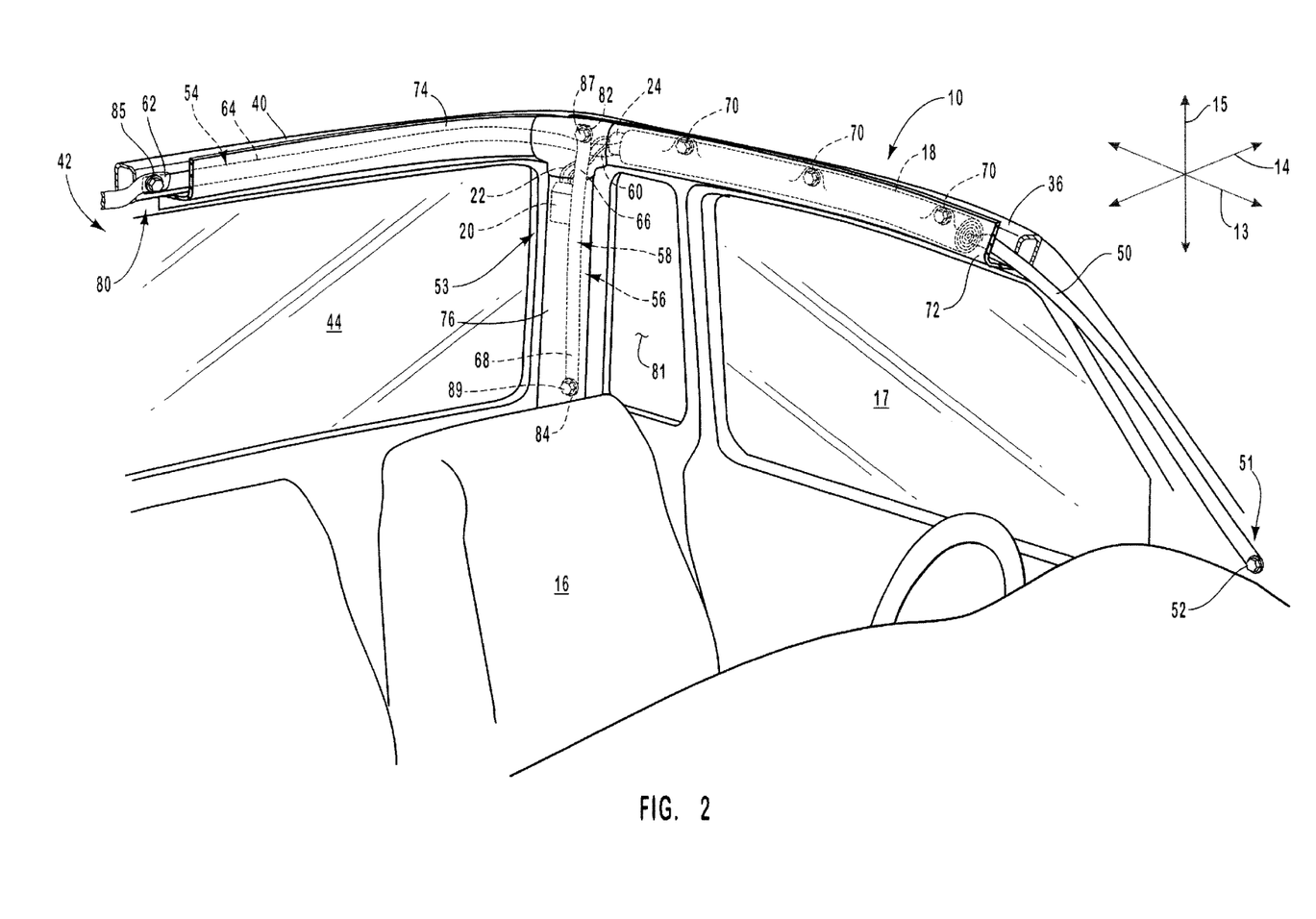
FIG. 2 is a cutaway, perspective view of the vehicle of FIG. 1, with the cushion in the stowed configuration.
Figure 3:
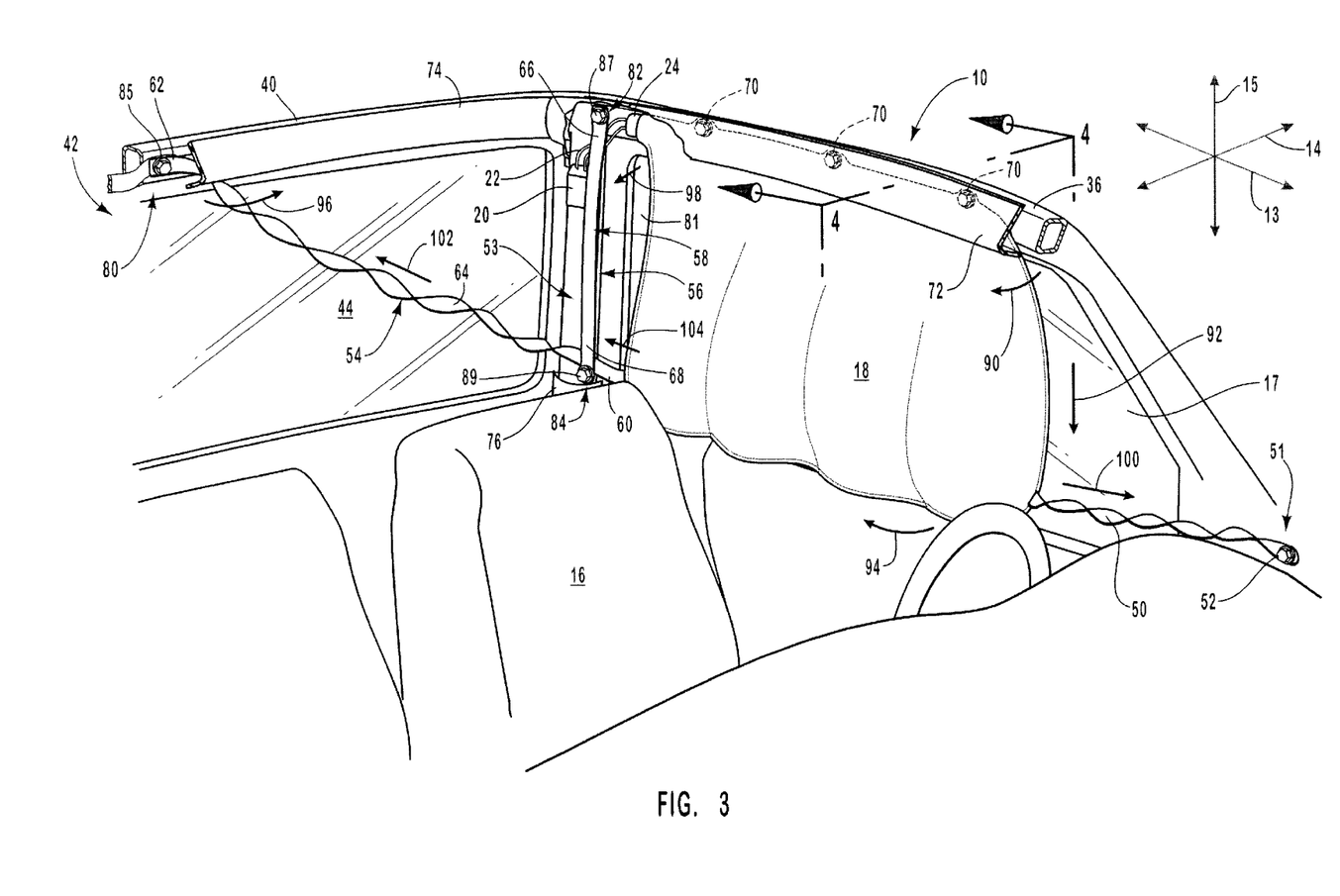
FIG. 3 is a cutaway, perspective view of the vehicle of FIG. 1, with the cushion in a deployed configuration.

The attachment assemblies 53 may be used to provide rearward tension to support the cushions 18 during inflation and impact of vehicle occupants against the cushion 18. The attachment assemblies 53 may also be concealed in an unobtrusive manner during normal operation of the vehicle. FIG. 2 shows one manner in which the tether assemblies 53 may be disposed when the IC modules 10 are in the stowed configuration, and FIG. 3 shows the disposition of the attachment assemblies 53 when the IC modules 10 have deployed to provide impact protection.

Referring to FIG. 2, a cutaway view of the driver's side of the vehicle 12 is shown, with the associated IC module 10 in the stowed configuration. Reference is now made to the IC module 10 of the driver's side. As shown, the rear tether 54 may have a first end 60, a second end 62, and an intermediate portion 64 between the first and second ends 60, 62. The first end 60 may be attached to the cushion 18 and the second end 62 may be attached to the vehicle 12. The intermediate portion 64 may be captured by the tether restraint assembly 56. More specifically, the intermediate portion 64 may be constrained to move between a first end 66 and a second end 68 of the tether restraint member 58.

The cushion 18 may be attached to the roof rail 36 through the use of attachment tabs 70, which may be integrally formed with the fabric of the cushion 18. A wide variety of other attachment mechanisms may also be used in conjunction with, or in place of, the attachment tabs 70. The cushion 18 may be compacted against the roof rail 36; as shown in FIG. 2, compaction may entail rolling the cushion 18 against the roof rail 36. Other compaction methods, such as accordion folding, may also be used.

The cushion 18, in its stowed configuration, may be effectively concealed by roof rail trim 72. Similarly, rear strut trim 74 may be used to conceal the rear tether 54, and rear side trim 76 may cover the tether restraint member 58. Other components of the IC module 10, such as the accelerometer 20, electric line 22, and inflator 24, may also be positioned behind the roof rail trim 72, the rear strut trim 74, the rear side trim 76, or some combination thereof.

The trim 72, 74, 76 may be constructed of a flexible material such as plastic that matches the remainder of the interior of the vehicle 12. Upon deployment of the cushion 18, the trim 72, 74, and 76 may deflect to permit emergence of the cushion 18 and the rear tether 54, in a manner that will be shown and described in greater detail hereafter.

The first end 60 of the rear tether 54 may be affixed to a rear tether anchoring point 80 within the vehicle 12, for example, on the abrupt rear surface 42 or the roof 38. As shown in FIG. 2, the rear tether anchoring point 80 is positioned on the abrupt rear surface 42, at a juncture of the roof 38 with the abrupt rear surface 42.

The tether restraint assembly 56 may include a vehicle surface 81 disposed alongside the inflated position of the cushion 18. For example, the vehicle surface 81 may be located rearward of the door 17. The tether restraint member 58 may be attached to the vehicle surface 81 such that the tether restraint member 58 is disposed generally vertically, or along the transverse 15 direction. More specifically, the first end 66 of the rear tether 54 may be attached at a first restraint anchoring point 82 of the vehicle surface 81, and the second end 68 of the rear tether 54 may be attached at a second restraint anchoring point 84 disposed generally below the first restraint anchoring point 82.

The second end 62 of the rear tether 54 may be attached at the rear tether anchoring point 80 by a rear tether anchor 85. Similarly, the first and second ends 66, 68 of the tether restraint member 58 may be attached at the first and second restraint anchoring points 82, 84 by first and second restraint anchors 87, 89. The anchors 85, 87, 89 may take the form of bolts, anchor plates, rivets, sewn attachments, adhesive interfaces, welded interfaces, or any other known attachment mechanism. In the configuration of FIG. 2, the anchors 85, 87, 89 take the form of conventional bolts.

Referring to FIG. 3, a cutaway view of the driver's side of the vehicle 12 is shown, with the associated IC module 10 in the deployed configuration. When the accelerometer 20 detects a sudden change in velocity, the inflator 24 may deploy to inject expanding gases into the cushion 18. The cushion 18 may then unroll to extend generally downward from the roof rail 36.

In order to permit the cushion 18 to escape from the roof rail trim 72, the roof rail trim 72 may be attached to the roof rail 36 in such a manner that the lower edge of the roof rail trim 72 can open in an opening direction indicated by the arrow 90. The cushion 18 may then unroll to extend in a deployment direction, shown by the arrow 92. The cushion 18 may initially be rolled inward, in such a manner that the lower edge of the cushion 18 of the driver's side unrolls in a clockwise manner when viewed from the front of the vehicle 12. Thus, the bottom edge of the cushion 18 may unroll in the direction shown by the arrow 94.

If the front tether 50 and the rear tether 54 lie substantially flat along the A pillar 34, the roof rail 36, and the rear strut 40 when the cushion 18 is rolled, as shown in FIG. 2, the tethers 50, 54 will twist in the direction 94 as the cushion 18 unrolls. Thus, the front and rear tethers 50, 54 are each twisted in the deployed configuration depicted in FIGS. 1 and 3. Alternatively, the front and rear tether anchors 52, 85 may be rotatable couplings that permit rotation of the attached ends of the front and rear tethers 50, 54 to ensure that twisting does not occur. However, twisting may not impair the operation of the tethers 50, 54, and may even increase the tension exerted by the tethers 50, 54 against the cushion 18 because the tethers 50, 54 shorten as twisting occurs.

The first end 60 of the rear tether 54 may also move in the deployment direction 92 as the cushion 18 deploys. Thus, during deployment, the rear tether 54 may escape from the rear strut trim 74 in a manner similar to the cushion 18. The rear strut trim 74 may be attached to the rear strut 40 in such a manner that the rear strut trim 74 opens in an opening direction 96 to permit escape of the rear trim 54, except for the first end 60. When the cushion 18 is fully deployed, the rear tether 54 may extend diagonally downward from the rear tether anchoring point 80, as depicted in FIG. 3.

The intermediate portion 64 of the rear tether 54 is captured between the tether restraint member 58 and the vehicle surface 81. However, the intermediate portion 64 is able to slide in the transverse direction 15 during deployment. The intermediate portion 64 may have a near perpendicular bend directly rearward of the tether restraint member 58 as the intermediate portion 64 passes behind the tether restraint member 58 from the abrupt rear surface 42. If desired, the rear side trim 76 may break away from the abrupt rear surface 42 and/or the vehicle surface 18 in an opening direction 98 to permit the rear tether 54 to slide transversely behind the rear side trim 76 while the cushion 18 inflates.

When the IC module 10 has reached the deployed configuration, as shown in FIG. 3, the front and rear tethers 50, 54 may provide tension in opposite directions to hold the cushion 18 in place. More specifically, the front tether 50 may provide tension in a front tension direction 100. The rear tether 54 may provide rear tension direction 102 proximate the second end 62. The rear tension direction 102 is substantially a combination of the lateral and transverse directions 14, 15. In effect, the tension provided by the rear tether 54 near the second end 62 is upward and inward, with respect to the second end 60, at which the rear tether 54 is attached to the cushion 18.

Tension in the rear tension direction 102 may help to keep the cushion 18 from swinging outward. However, such tension does not prevent the cushion 18 from swinging inward, as may occur during inflation due to the expansion of inflation gases within the cushion 18. Furthermore, tension in the rear tension direction 102 does not directly counteract that of the front tension direction 100, thereby permitting motion of the cushion 18 in the longitudinal direction 13 and/or undesirable pivotal motion about the transverse direction 15.

However, through the operation of the tether restraint assembly 56, the tension actually exerted by the rear tether 54 against the cushion 18 is in a redirected tension direction 104, which is generally longitudinal in orientation. Thus, the cushion 18 is pulled directly forward and rearward, so that the cushion 18 is unable to significantly pivot inward or outward.

Thus, occupants of the vehicle 12 are protected against vehicle excursion as well as from inward inflation of the cushion 18. Furthermore, the redirected tension direction 104 is nearly aligned with the front tension direction 100. As a result, the cushion 18 may be kept from motion in the longitudinal direction 13 or from any other undesirable pivotal motion. The front and rear tethers 50, 54 may provide tension at or near the level of the bottom edge of the cushion to support the cushion 18 along its entire transverse length, and to reduce the likelihood that any body part will pass underneath the cushion 18 to impact the door 17.

The tether restraint assembly 56 effectively permits the rear tether 54 to exert tension against the cushion 18 in much the same manner as a tether that extends directly rearward to attach to a point in-plane with the cushion 18. Out-of-plane attachment permits the rear tether 54 to lie along the rear strut 40, as shown, and to deploy against the abrupt rear surface 42, thereby avoiding interference from occupants, parts of the vehicle 12, or objects within the vehicle 12. The concept of out-of-plane attachment will be clarified in connection with FIG. 4.

Figure 4:
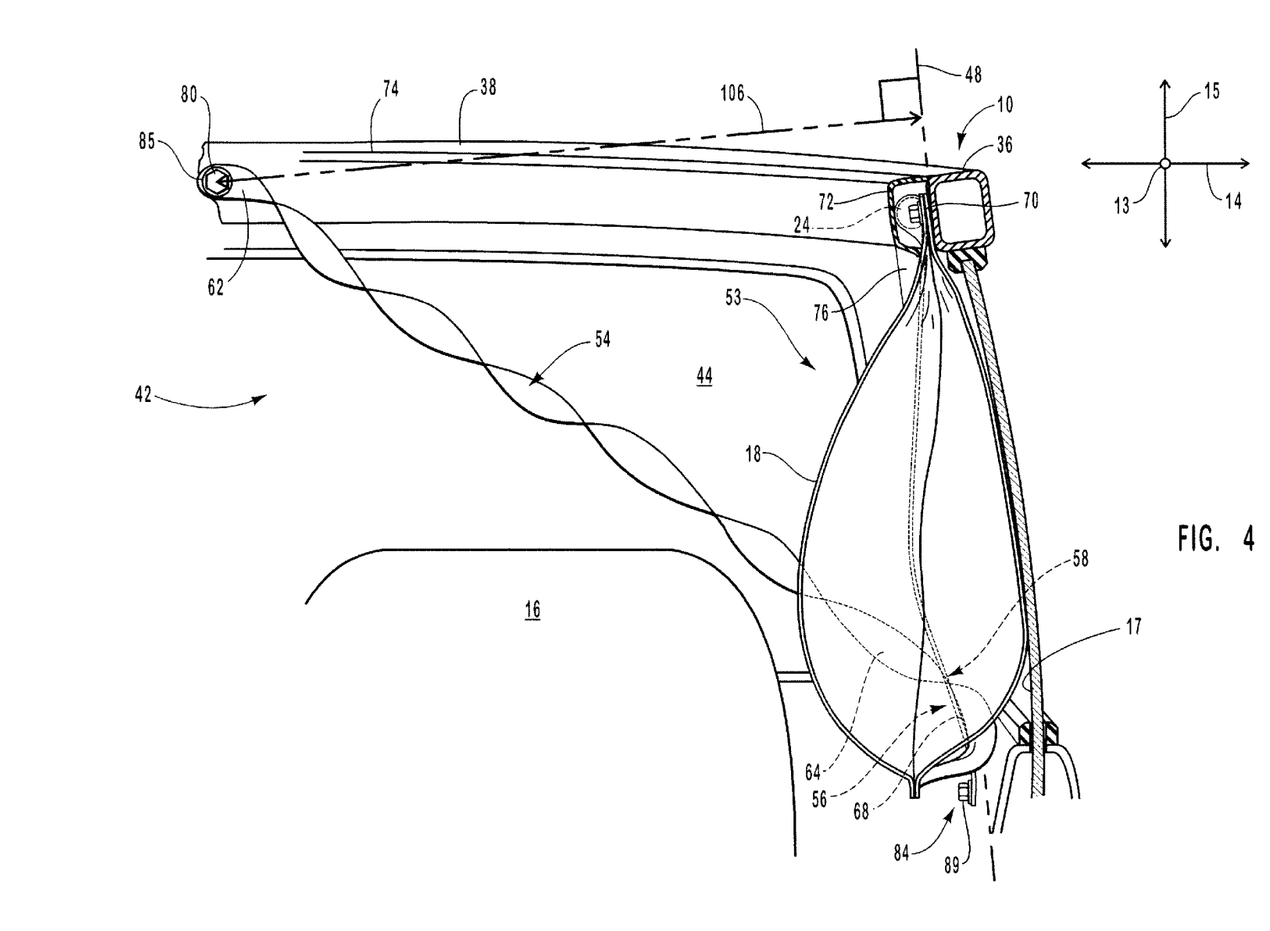
FIG. 4 is a front elevation, section view of the vehicle of FIG. 1, with the cushion in the deployed configuration.

Referring to FIG. 4, a front elevation, section view of the driver's side of the vehicle 12 is shown. Once again, the IC module 10 is in the deployed configuration. The protection plane 48 is once again shown. In FIG. 4, an edge view of the protection plane 48 is depicted under the assumption that the protection plane 48 will extend directly along the longitudinal direction 13. As shown, the protection plane 48 is angled somewhat from top to bottom to account for the sloping geometry of the door 17. The protection plane 48 may, of course, have any orientation, depending on the exact geometry of the vehicle 12.

The rear tether anchoring point 80 does not lie within the protection plane 48; rather, the rear tether anchoring point 80 is laterally offset from the protection plane 48 by an offset 106. As depicted, the offset 106 which may be greater than about 12 inches is considerable. If a single rear tether anchor 85 is used the rear tethers 54 of both IC modules 10, the offset 106 may be about half the width of the roof 38. The offset 106 permits the use of a sufficient length of the rear tether 54 to allow deployment of the cushion 18. A smaller offset may be used; however, the offset must be large enough that the rear tether 54 need not stretch unduly to reach the deployed cushion 18.

Of course, the rear tether anchoring point 80 may be located at other positions, such as on the roof 38 or on the abrupt rear surface 42, below the rear window 44. However, the position shown, at the juncture of the roof 38 and the abrupt rear surface 42, may be optimal for ensuring that the rear tether 54 can be unobtrusively stowed and deployed with a minimum of interference.

As mentioned previously, the tether restraint assembly 56 enables the rear tether 54 to provide rearward tension on the cushion 18, despite the existence of the offset 106. The tether restraint assembly 56, as embodied in FIGS. 1 through 4, may provide tether redirection with comparatively little a minimum of manufacturing and installation expense. However, many other configurations of a tether restraint assembly may be used to provide tension redirection according to the invention. One such alternative configuration is depicted in FIG. 5.

Figure 5:
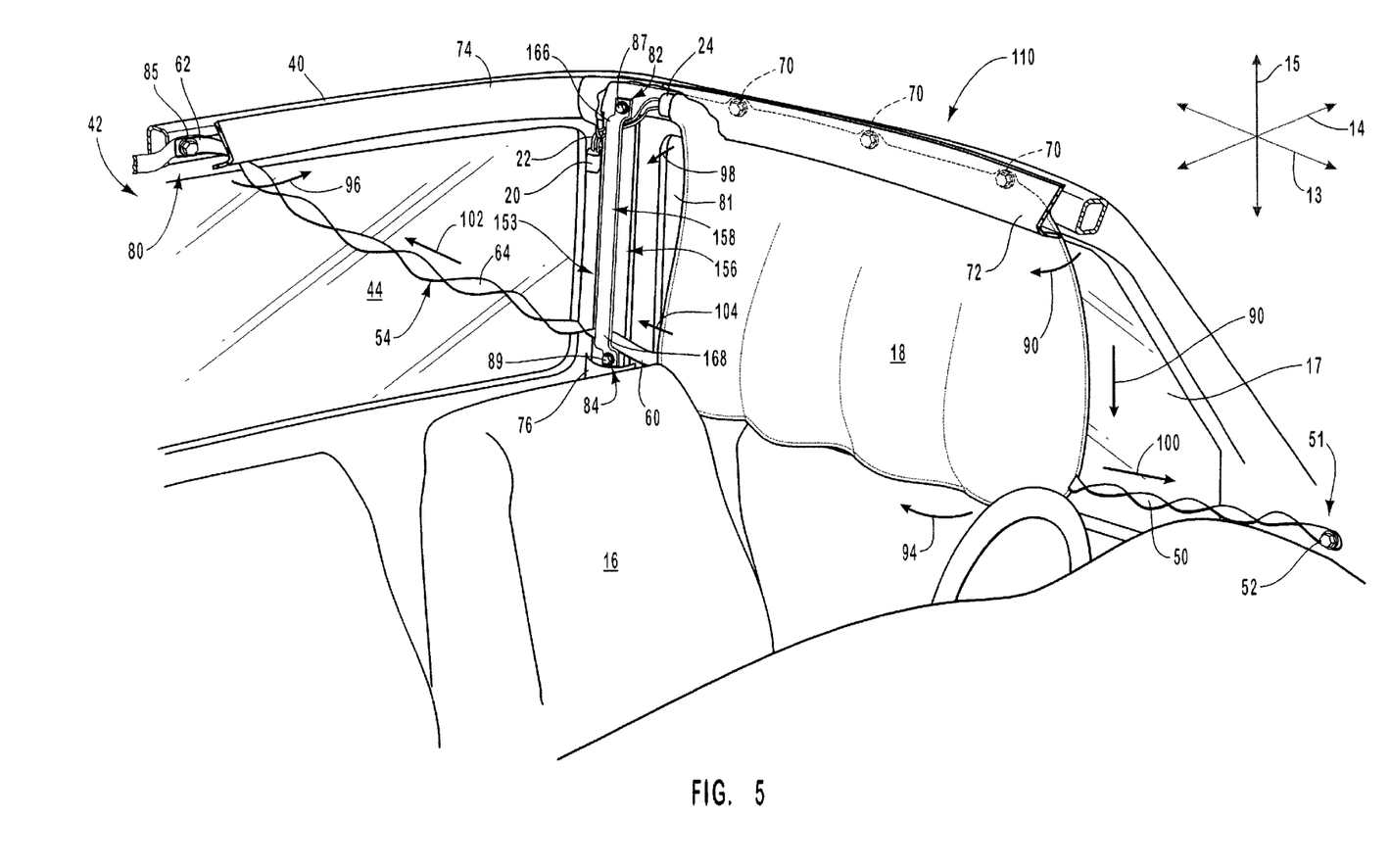
FIG. 5 is a cutaway, perspective view of a vehicle incorporating an alternative embodiment of a tethering system according to the invention.

Referring to FIG. 5, a cutaway, perspective view of the driver's side of the vehicle 12 shows the configuration of an alternative embodiment of an IC module 110 according to the invention. The cushion 18 of the IC module 110 is shown in the deployed configuration.

The IC module 110 may be configured in a manner similar to the IC module 10 described previously, with a front tether 50 that exerts forward tension on the cushion 18 and a rear tether attachment assembly 153 that exerts a complementary rearward tension, within the confines of the vehicle 12. A rear tether 54 of the rear tether attachment assembly 153 may be configured and attached to the vehicle 12 and the cushion 18 in substantially the same manner as described in connection with the previous embodiment.

The rear tether attachment assembly 153 may also have a tether restraint assembly 156 that includes the vehicle surface 81 and a tether restraint member 158. As above, the vehicle surface 81 may be positioned rearward of the door 17. However, the tether restraint member 158 may be a rigid member rather than a flexible strap, like the tether restraint member 58 of the previous embodiment.

More specifically, the tether restraint member 158 may be a rigid bar constructed of a sturdy material, such as a metal. The tether restraint member 158 may have a cross section with a generally round cross section to ensure that the rear tether 54 is not damaged as it slides against the tether restraint member 158. The tether restraint member 158 may be flattened at first and second ends 166, 168 thereof to permit simple attachment to the vehicle surface 81. As with the tether restraint member 58, the tether restraint member 158 may be attached to first and second restraint anchoring points 82, 84 of the vehicle surface 81 by first and second restraint anchors 87, 89.

The operation of the IC module 110 may be substantially the same as that of the IC module 10, as described above. More specifically, the rear tether 54 may lie along the rear strut 40 when the IC module 110 is in the stowed configuration. Upon deployment, the roof rail trim 72, the rear strut trim 74, and the rear side trim 76 may open or detach to permit emergence of the cushion 18 and the rear tether 54. The rear tether 54 may slide along the tether restraint member 158 as the cushion 18 deploys to provide rearward tension on the cushion 18. Twisting of the tethers 50, 54 may or may not occur, depending on the manner in which the tethers 50, 54 are attached to the vehicle 12 and the type of compaction process used to compact the cushion 18.

The tethering systems and methods of the present invention provide a significant advancement in airbag design. The tether attachment assemblies of the present invention enable cushions of inflatable curtain modules to be firmly restrained from inward or outward motion, thereby protecting vehicle occupants against bag slap and excursion from the vehicle. Through tension redirection, such protection can be accomplished within a compact space, so that comprehensive protection can be extended to passengers of trucks, SUVs, and other vehicles in which space rearward of the cushions is limited. Furthermore, the tether attachment assemblies may be economically manufactured and installed, and may be used with rolled or accordion folded cushions.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An inflatable curtain module configured to provide side impact protection for an occupant of a vehicle, the vehicle having an abrupt rear surface, the inflatable curtain module comprising:

a cushion configured to inflate in an inflation direction inward of a lateral surface of the vehicle;

a front tether attachable to the cushion and to a front tether anchoring point positioned forward of the cushion, within the vehicle;

a rear tether attachable to the cushion and to a rear tether anchoring point positioned proximate the abrupt rear surface; and a tether restraint member have a length disposable along the inflation direction, wherein the tether restraint member is configured to intersect an intermediate portion of the rear tether to redirect tension from the rear tether to exert tension on the cushion in a rearward direction.

2. The inflatable curtain module of claim 1, wherein the tether restraint member is configured to permit twisting of the rear tether during deployment of the cushion.

3. The inflatable curtain module of claim 2, wherein the cushion is stowed in the vehicle in a rolled configuration.

4. The inflatable curtain module of claim 2, wherein the cushion is stowed in an accordion configuration.

5. The inflatable curtain module of claim 1, wherein the rear tether anchoring point is disposed such that at least a portion of the rear tether lies substantially perpendicular to the cushion when the cushion is stowed.

6. The inflatable curtain module of claim 5, wherein the rear tether restraint member has a length selected to permit sliding of the rear tether against the rear tether restraint member during deployment of the cushion.

7. The inflatable curtain module of claim 6, wherein the rear tether bends in near-perpendicular fashion around the tether restraint member.

8. The inflatable curtain module of claim 5, wherein the tether restraint member comprises a flexible strap having first and second ends affixed to the vehicle.

9. The inflatable curtain module of claim 5, wherein the tether restraint member comprises a rigid bar having first and second ends affixed to the vehicle.

10. The inflatable curtain module of claim 1, wherein the tether restraint member is affixed to a vehicle surface parallel to the lateral surface such that at least a portion of the rear tether is sandwiched between the vehicle surface and the tether restraint member.

11. The inflatable curtain module of claim 1, wherein the rear tether anchoring point is located on the abrupt rear surface.

12. An inflatable curtain module having a stowed configuration in which the module is stored comparatively compactly in a vehicle, and a deployed configuration in which the module is operable to provide lateral impact protection, the module comprising:

a cushion configured to be disposed along a portion of a protection plane in the deployed configuration;

a tether anchor positioned within the vehicle, offset from the protection plane; and a tether configured to transmit tension tending to restrict motion of the cushion in either direction perpendicular to the protection plane in the deployed configuration, the tether having a first end attached to the cushion and a second end attached to the tether anchor;

wherein the tether anchor is laterally offset from the protection plane by a distance greater than about twelve inches.

13. The inflatable curtain module of claim 12, wherein the tether anchor is disposed proximate a juncture of a roof of the vehicle and an abrupt rear surface of the vehicle.

14. The inflatable curtain module of claim 12, further comprising a tether restraint member configured to redirect tension exerted by the tether against the cushion to a direction substantially parallel to the protection plane.

15. An inflatable curtain module having a stowed configuration in which the module is stored comparatively compactly in a vehicle, and a deployed configuration in which the module is operable to provide lateral impact protection, the module comprising:

a cushion configured to be disposed along a portion of a protection plane extending longitudinally along a lateral surface of the vehicle in the deployed configuration;

a tether disposable along a tether path between a tether anchoring point within the vehicle and the cushion to transmit tension between the tether anchoring point and the cushion; and a tether restraint member positionable to directly block motion of an intermediate portion of the tether away from the protection plane to bend the tether path such that a substantial portion of the tension transmitted by the tether to the cushion is in the longitudinal direction.

16. The inflatable curtain module of claim 15, wherein the tether is configured to exert a magnitude of tension on the cushion sufficient to substantially prevent occupant excursion during a rollover of the vehicle.

17. The inflatable curtain module of claim 15, wherein the tether restraint member is substantially vertically oriented.

18. The inflatable curtain module of claim 17, wherein the tether restraint member is affixed to a vehicle surface disposed rearward of the lateral surface, proximate the cushion.

19. The inflatable curtain module of claim 15, wherein the cushion is configured to be affixed to one of two substantially parallel roof rails of the vehicle, and wherein the tether anchoring point is disposed substantially between the roof rails.

20. A tether attachment assembly configured to restrain a deployed cushion for an airbag system of a vehicle, the tether attachment assembly comprising:

a tether anchor;

a tether having a first end affixed to the cushion and a second end affixed to the tether anchor, the tether having an intermediate portion between the first and second ends;

a first restraint anchor;

a second restraint anchor; and a tether restraint member attachable to the vehicle by the first and second restraint anchors, the tether restraint member having a length between the first and second anchors along which the intermediate portion of the tether is slidable to accommodate motion of the first end of the tether in response to deployment of the cushion.

21. The tether attachment assembly of claim 20, wherein the tether has a length sufficient to permit fixation of the tether anchor to a juncture of a roof of the vehicle and an abrupt rear surface of the vehicle.

22. The tether attachment assembly of claim 20, wherein the tether restraint member comprises a flexible strap with a first end affixed to the vehicle by the first restraint anchor and a second end affixed to the vehicle by the second restraint anchor.

23. The tether attachment assembly of claim 20, wherein the tether restraint member comprises a rigid bar with a first end affixed to the vehicle by the first restraint anchor and a second end affixed to the vehicle by the second restraint anchor.

24. A tether restraint assembly configured to restrain a tether attached to a cushion for an airbag system of a vehicle, wherein the cushion is configured to deploy along a deployment direction, the tether restraint assembly comprising:

a vehicle surface having first and second restraint anchoring points arrayed along the deployment direction; and a tether restraint member having a first end attached to the first restraint anchoring point and a second end attached to the second restraint anchoring point such that a length of the tether restraint member between the restraint anchoring points is oriented along the deployment direction;

wherein the tether restraint member extends away from the vehicle surface between the first and second ends to permit passage of the tether between the tether restraint member and the vehicle surface.

25. The tether restraint assembly of claim 24, wherein the tether restraint member is flexible.

26. The tether restraint assembly of claim 24, wherein the tether restraint member is rigid.

27. The tether restraint assembly of claim 24, wherein the vehicle surface is disposed rearward of a deployed position of the cushion.

28. A method for restraining motion of an occupant of a vehicle through a protection plane, the method comprising:

providing a cushion configured to deploy along the protection plane;

providing a tether having a first end, a second end, and an intermediate portion disposed between the first and second ends, wherein the second end is configured to be attached to a tether anchoring point within the vehicle;

affixing the first end of the tether to the cushion; and providing a tether restraint member having a length selected to permit sliding of the intermediate portion of the tether against the tether restraint member as the cushion deploys to direct tension exerted by the tether against the cushion to a direction selected to maintain the cushion substantially within the protection plane.

29. The method of claim 28, further comprising:

affixing a first end of the tether restraint member to a first restraint anchoring point of a vehicle surface; and affixing a second end of the tether restraint member to a second restraint anchoring point of the vehicle surface.

30. The method of claim 29, further comprising inserting the second end between the tether restraint member and the vehicle surface such that the intermediate portion abuts the tether restraint member.

31. The method of claim 30, further comprising affixing the second end of the tether to the tether anchoring point.

32. The method of claim 31, further comprising rolling the cushion for compact storage in the vehicle.

33. The method of claim 31, further comprising accordion folding the cushion for compact storage in the vehicle.

34. A method for restraining a deployed cushion for an airbag system of a vehicle, the method comprising:

providing a tether having a first end, a second end, and an intermediate portion;

attaching the first end of the tether to the cushion;

attaching the second end of the tether to a tether anchoring point within the vehicle;

providing a tether restraint member positioning the tether restraint member such that the intermediate portion of the tether is sandwiched between the tether restraint member and an interior surface of the vehicle; and affixing the tether restraint member to first and second restraint anchoring points of the interior surface, wherein the first and second restraint anchoring points are disposed on opposite sides of the tether.

35. The method of claim 34, wherein providing the tether restraint member comprises providing a flexible strap of a length selected to permit sliding of the tether along the flexible strap between the first and second restraint anchoring points to accommodate deployment of the cushion.

36. The method of claim 34, wherein providing the tether restraint member comprises providing a rigid bar of a length selected to permit sliding of the tether along the rigid bar between the first and second restraint anchoring points to accommodate deployment of the cushion.

* * * * *